Jan. 28, 1969  J. C. MACLAY  3,423,946
UNDERSEA REPEATER BURYING PLOWSHARE
Filed June 7, 1967 Sheet _1_ of 2
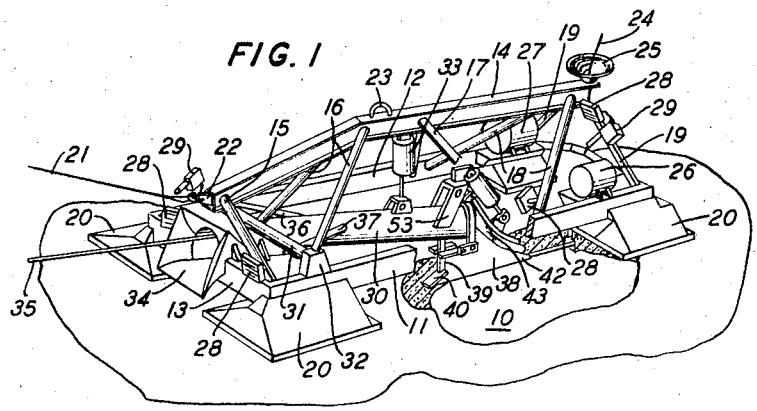
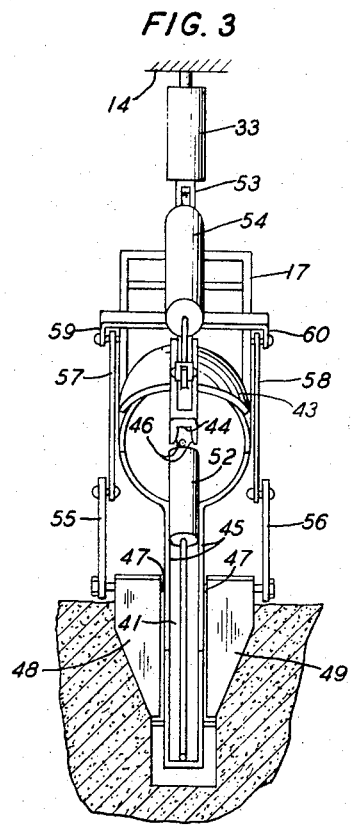
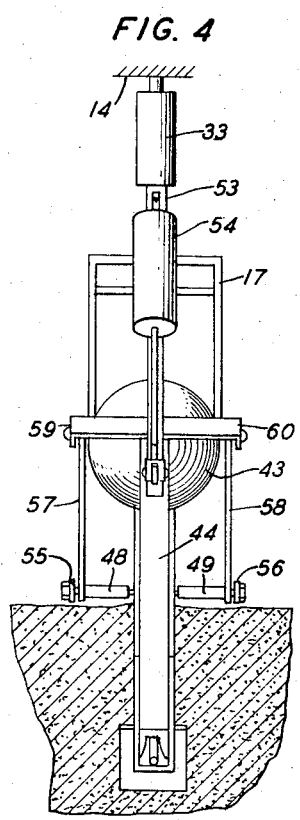
INVENTOR
J. C. MACLAY
BY Charles E. Grants
ATTORNEY United States Patent Office 3,423,946
Patented Jan. 28, 1969

3,423,946
UNDERSEA REPEATER BURYING PLOWSHARE
John C. Maclay, Basking Ridge, N.J., assignor to Bell Telephone Laboratories, Incorporated, Murray Hill, N.J., a corporation of New York
Filed June 7, 1967, Ser. No. 644,222
U.S. Cl. 61—72.4        7 Claims
Int. Cl. B63b 35/04, 35/00

ABSTRACT OF THE DISCLOSURE

A cable burying plow especially adapted for burying submarine cable comprises a sled with cable tube and plowshare attached to the tube rear. The plowshare includes a cable guide groove along its top surface and a tailgate which maintains the cable in the groove during burying. Repeaters are passed by raising the tailgate. This motion also lowers secondary plow vanes which dig a trench for the repeater.

This invention relates to cable burying apparatus and, more specifically, to ocean cable burying plows having an enhanced capability for handling repeaters.

Experience with man-induced breaks in transatlantic cables in recent years has indicated clearly the need to bury cables wherever they pass through areas of significant fishing and dredging activity.

Cable burial is achieved with one form or another of plow. Essentially, these plows consist typically of a sled or body, a long cable tube mounted in the body, and a plowshare at the tube's end which digs a trench and guides the cable from the tube into the trench.

The merit of a given plow depends in general upon its ability to safely handle cable and repeater at reasonable speeds of advance and in varying bottom soil types. This invention is directed to improvements in two primary aspects of cable burying plow design: the cable burying function; and, importantly, the repeater handling function.

The following are primary objects of the invention:
To expedite handling of the cable during burial;
To reduce the chances of cable damage during burial;
To reduce the overall cost of cable burying operations; and
To enable the burial of repeaters.

Summary of the invention

These and other objects of the invention are broadly achieved by a combination plowshare and cable tube pivotally mounted at the front end of a plow body and comprising a cable guide path along the rear edge of the plowshare, the guide path having a retractable feed tube tailgate which when lowered retains the cable in its guide path and when raised allows the relatively thick, rigid repeaters to pass.

Accordingly, one feature of the invention concerns structure for receiving both cable and repeaters; and for guiding the cable into a plowed trench.

A further feature of the invention relates to a secondary plow system for digging a trench for repeaters which otherwise would be left relatively exposed on the ocean floor.

Description of the drawing

FIG. 1 is a side perspective view in schematic form of a plow embodying the inventive principles;

FIG. 3 is a rear schematic view of the cable tube and tailgate with tailgate lowered; and FIG. 4 is similar to FIG. 3, with tailgate raised.

Detailed description of an illustrative embodiment

Figure 2A:
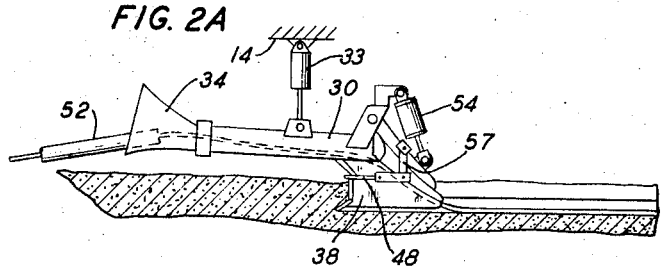
FIGS. 2A–2D depict schematically four stages in the handling of repeaters.

FIG. 1 illustrates a cable burying plow embodying the inventive concepts. The overall plow designated 10, includes a body frame consisting of bottom channels 11 and 12 joined at the front by cross member 13. A top channel 14 is connected to channels 10, 11 by several structural pipe section pairs 15, 16, 17, 18, 19; the locations of the points of connection as shown in FIG. 1 being merely illustrative. The frame rides along the ocean bottom on runners which may, for example, comprise sleds 20. The plow 10 is towed by a chain 21 that is selectively connected to a towing harness 22 and a lifting harness 23 by explosive bolt systems well known in the art. A power and control cable 24 from a tender ship enters the plow through a service connection 25. Suitable wiring (not shown) is effected from cable 24 to a pressure drum junction box 26, from which further connections to a hydraulic power pack 27, lights 28, and TV cameras 29 are effected as is common in equipment of this type.

The cable and repeater handling system comprises a cable tube 30 attached to a pivot shaft 31 which is mounted in two bearing blocks 32 (one shown) connected symmetrically onto channels 10, 11. A hydraulic cylinder 33, connected between tube 30 and top channel 14 and controlled through lines (not shown) from power pack 27, effects the pivotal movement of tube 30 in a vertical plane below channel 14. To the forward end of tube 30 is connected a wide bellmouth 34 for receiving a communications cable 35 being fed from the tender ship. Steadying bars 36, 37 are connected from either side of tube 30 and respectively to the ends of shaft 31.

At the rear end of tube 30, integral with its underside, is a plowshare 38 comprising a vertical cutting edge 39 and a point 40 which slopes down in a forward direction. The top or back edge of plowshare 38, as shown in FIG. 3, includes a groove or chute 41 which receives the cable 35 from tube 30 and guides it down into the plowed trench. Pursuant to one aspect of the invention, a tailgate 42 pivotally attached to a mount 53 on tube 30 comprises a funnel portion 43 that engages like portions of tube 30, and a channel 44 that engages chute 41 to maintain the cable in the chute during burying operations. In the embodiment shown, chute 41 includes wall portions 45 and channel 44 includes wall portions 46. As seen in FIG. 4, the wall portions 46 engage inwardly of, and within, wall portions 45 when tailgate 42 is engaged, thus further assuring proper alignment of the cable within its chute. Hydraulic cylinder 54 connected to mount 53 effects the lowering and raising of tailgate 42.

A secondary trencher consisting of two vanes 48, 49 pivotally attached via pin 47 through plowshare 38. Rigidly attached to vanes 48, 49 are arms 55, 56. Levers 57, 58 are pivotally attached to arms 55, 56, respectively, and also to opposite sides of tailgate 42 at points 59, 60. The vanes as pivoted from pin 47 are located at a point situated above the ocean floor level when plowshare 38 is fully lowered. Hence, the vanes do not engage the soil as long as tailgate 42 is lowered or engaged. In such case, the linkages 55, 56, 57, 58 are chosen to keep the vanes essentially horizontal and pointed forwardly as seen in FIG. 4.

Figure 2B:
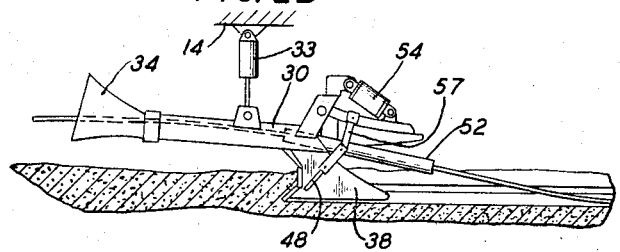
Figure 2C:
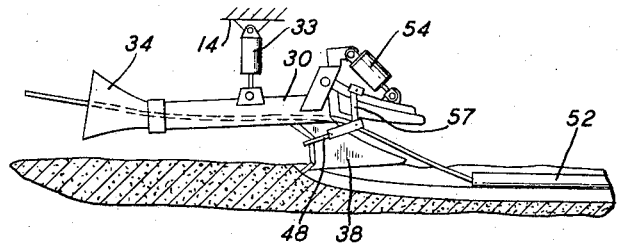
Figure 2D:
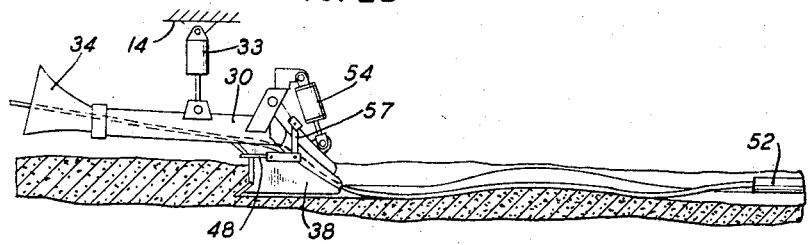

Repeater handling and burying is illustrated in FIGS. 2A–2D and occurs in the following way. With plowshare 38 fully lowered cable burying proceeds until as pictured in FIG. 2A, a repeater is encountered. As the chute section 43 and curvature of the plowshare upper edge will not accommodate a repeater, the tailgate 42 is raised as in FIG. 2B. This action allows the repeater 52 to pass, and concurrently digs the vanes 48, 49 into the soil as in FIG. 3. Raising of tailgate 42 also allows the cable 35 to disengage from the chute 41. Repeater 52 lodges in the special trench dug for it by vanes 48, 49; as in FIG. 2C; and it now remains to re-engage cable 35 in chute 41.

To help ensure that the cable 35 will again be engaged in chute 41, the tube 30 and plowshare 38 are raised (FIG. 2C), bringing chute 41 toward, and finally in contact with, the cable. The success of this step advantageously is monitored by one of the TV cameras 29. Then tailgate 42 is lowered into the described engagement with chute 41, and finally, as seen in FIG. 2D, the plowshare is again lowered into the ocean floor for resumption of cable burying operations. Raising of the plow brought to an end the secondary trench-digging of vanes 48, 49; and lowering of tailgate 42 pivoted them back to their non-digging horizontal rest positions.

It is to be understood that the embodiments described herein are merely illustrative of the principles of the invention. Various modifications may be made thereto by persons skilled in the art without departing from the spirit and scope of the invention.

What is claimed is:
1. A cable burying plow comprising:
   a frame;
   a cable tube centrally disposed within said frame and pivotally mounted from the forward end thereof;
   a plowshare integrally connected to the tube underside at the rear end thereof, said plowshare comprising a cable chute running from the tube rear end downwardly along the back edge of said plowshare and to the bottom thereof; and
   a tailgate pivotally engageable with said cable tube rear end and said cable chute for maintaining the cable in its chute, and disengageable with respect to said tube and chute to allow passage of repeaters.

2. A plow in accordance with claim 1, wherein said cable chute comprises a smooth groove bordered by two essentially vertical walls, and wherein said tailgate comprises an open channel formed with guide walls, the latter walls fitting within the walls of said groove when said tailgate is engaged with said cable chute.

3. A plow in accordance with claim 2, further comprising means for cutting a secondary trench for the burial of repeaters.

4. A plow in accordance with claim 2, further comprising means responsive to said disengagement of said tailgate from said tube and chute for cutting a secondary trench for the burying of repeaters.

5. A plow in accordance with claim 4, wherein said repeater burying means comprises two vanes pivotally mounted on respective sides of said plowshare at a point above ocean floor level when said plowshare is fully lowered, said vanes being forwardly disposed in a substantially horizontal plane when said tailgate is engaged, and further comprising means responsive to raising of said tailgate for rotating said vanes downwardly into plowing engagement with said ocean floor.

6. A plow in accordance with claim 5, further comprising a rearwardly disposed lever arm connected to each said vane, and lever means connecting said lever arms directly with said plowshare.

7. A repeater-burying plowshare comprising:
   a cable trench-digging plow comprising a cable guide along the rear edge thereof;
   a tailgate pivotally mounted on said cable plow and having a lowered position for enclosing said cable guide and a raised position for freeing said cable guide;
   a repeater trench-digging plow pivotally mounted upon said first-named plow and comprising a plowing vane on each side thereof; and
   means connecting said repeater plow with said tailgate, whereby opening of the latter lowers the former into plowing engagement with the ocean floor.

References Cited
UNITED STATES PATENTS

| | | | |
|---|---|---|---|
| 2,202,156 | 5/1940 | Lawton | 61—72.4 |
| 3,004,392 | 10/1961 | Symmank | 61—72.4 |
| 3,333,432 | 8/1967 | Hale et al. | 61—72.4 |
| 3,347,054 | 10/1967 | Sherrod | 61—72.4 |

EARL J. WITMER, *Primary Examiner.*

U.S. Cl. X.R.
61—72.6